OR    3,731,987

United Sta[tes Patent] [19]
Iida et al.

[11]   3,731,987
[45]   May 8, 1973

[54] ZOOM LENS MOUNT ASSEMBLY WITH MEANS FOR CLOSE-UP FOCUSING

[76] Inventors: Yozo Iida, 786 Izuni Komae-machi, Kitatama-gun, Tokyo; Hideyo Nozawa, 2-256 Yohga-machi Tanagawa, Setagaya-ku, Tokyo, both of Japan

[22] Filed: Aug. 13, 1971

[21] Appl. No.: 171,530

[30]    Foreign Application Priority Data

Aug. 18, 1970   Japan..............................45/71709

[52] U.S. Cl...................................350/187, 350/255
[51] Int. Cl.................................................G02b 7/10
[58] Field of Search......................350/187, 184, 186

[56]   References Cited
   UNITED STATES PATENTS

| 3,465,662 | 9/1969 | Kashiwase | 350/187 X |
| 3,391,973 | 7/1968 | Laurent | 350/186 X |
| 3,582,188 | 6/1971 | Rau | 350/187 X |

*Primary Examiner*—John K. Corbin
*Attorney*—Harry G. Shapiro

[57]   ABSTRACT

A zoom lens assembly includes a focusing lens system, a magnification varying lens system consisting of two movable lens groups, and an image forming lens system. Movement of an operating ring in the assembly simultaneously moves the two movable lens groups according to a predetermined relationship. The operating ring also adjusts the distance between the two movable lens groups so that the simultaneous movement according to the predetermined relationship effects a zooming action or achieves focusing for ultra-short distances.

6 Claims, 4 Drawing Figures

PATENTED MAY 8 1973 3,731,987

INVENTORS
YOZO IIDA
HIDEYO NOZAWA
BY
Harry I. Shapiro
ATTORNEY

ZOOM LENS MOUNT ASSEMBLY WITH MEANS FOR CLOSE-UP FOCUSING

BACKGROUND OF THE INVENTION

1. Field of the Invention

This invention relates to a zoom lens assembly used with a camera.

2. Description of the Prior Art

Many well known zoom lenses have an optical train which comprises a focusing lens system for adjusting the focus, a magnification varying lens system consisting of a first and a second movable lens group both being movable for varying the magnification while maintaining a predetermined focusing position, and an image forming lens system for forming an image on a film surface. In effecting a zooming action, the first and second movable lens groups are positioned relative to each other for zooming and are moved in accordance with a predetermined relationship. Additionally, one of the first or second movable lens groups may be individually moved from its relative position for zooming to a position for close up focusing so that movement of the two lens groups in accordance with the predetermined relationship achieves focusing for ultra-short distances. However, a conventional mechanism for the movement of such movable lenses requires a gear train, and is very complicated and high-priced.

SUMMARY OF THE INVENTION

It is an object of the present invention to provide a compact zoom lens assembly having the functional capabilities described above, in which an operating ring achieves both zooming and close up focusing by moving both of the movable lens groups in their predetermined relationship, and controlling the distance between these lens groups by moving one of these lens groups individually.

According to the present invention, the zoom lens assembly comprises a fixed tube having a focusing lens system mounted for advancement and retraction within the forward end thereof. The fixed tube includes an image forming lens system fixedly mounted to the rear of the focusing lens system and a magnification varying lens system interposed between the focusing lens system and the image forming lens system. The magnification varying lens system consists of a first and a second movable lens group each slidable along the optical axis between the focusing and image forming lens systems. Two spaced, axially extending guide channels are formed in the fixed tube. A first cam cylinder formed with a first cam groove therein is rotatably fitted around the fixed tube, and a second cam cylinder formed with a second cam groove therein is rotatably and slidably fitted around the first cam cylinder. An escape groove is formed in the first cam cylinder at a location corresponding to the second cam groove of the second cam cylinder, the escape groove being dimensioned so that its circumferential length is at least equal to the circumferential length of the second cam groove and its axial width is equal to the axial travel distance of the second cam cylinder. Cam pins are provided for the two movable lens groups, one of the cam pins extending through one of the guide channels in the fixed tube into the first cam groove, and the other cam pin extending through the other guide channel and the escape groove into the second cam groove. An elongated straight guide channel is formed in one of the first and second cam cylinders axially or circumferentially thereof, and a pin is formed in the other of the two cam cylinders for engagement with the guide channel. A holding means is provided between the first and the second cam cylinders for maintaining the first and second movable lens groups in their relative position for zooming. The second cam cylinder may be moved axially or rotated to allow one or both of the two movable lens groups to move along the optical axis.

The above object and features of the present invention will become more apparent from the following detailed description taken in conjunction with the accompanying drawings.

DESCRIPTION OF THE PREFERRED EMBODIMENTS

Figure 1:
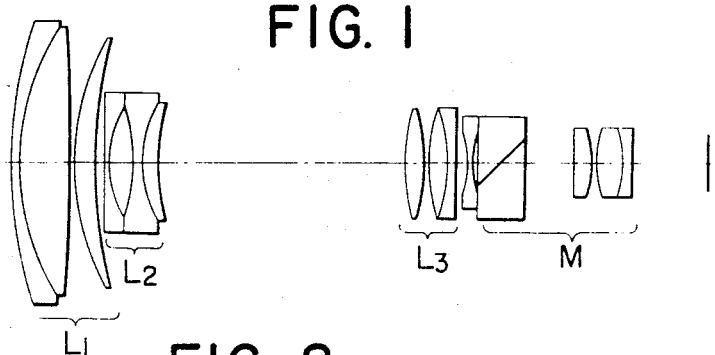
FIG. 1 is a schematic longitudinal view of the optical train forming a zoom lens which may be used with the present invention.

As shown in FIG. 1 the optical train of a zoom lens system includes a focusing lens system $L_1$ for adjusting the focus, a magnification varying lens system and an image forming lens system M for forming an image on a film surface. The magnification varying lens system consists of a first movable lens group $L_2$ and a second movable lens group $L_3$, both movable for varying the magnification while maintaining a predetermined focusing position. In effecting zooming action, the first and second movable lens groups $L_2$ and $L_3$ are both moved axially and with respect to one another in a predetermined relationship. In addition, one of the first and second lens groups $L_2$ and $L_3$ may be individually moved from its relative position for zooming to a position for close up focusing so that movement of the two lens groups in the same predetermined relationship achieves focusing for ultra-short distances.

Figure 2:
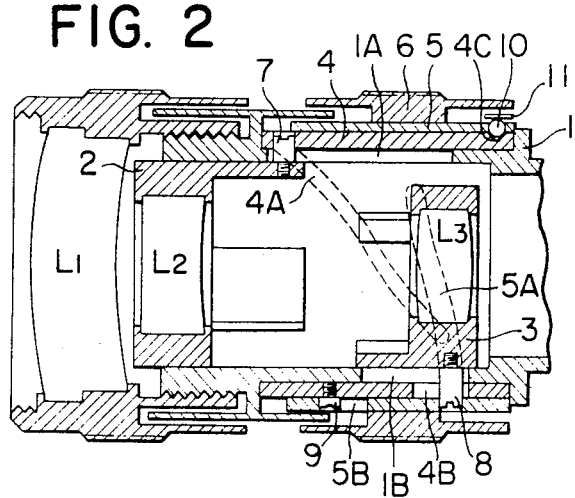
FIG. 2 is a fragmentary, longitudinal cross section of a zoom lens assembly according to the present invention, this view showing a position for zooming.

Referring to FIG. 2, there is shown an embodiment of the invention as applied to the zoom lens system shown in FIG. 1. A fixed tube 1 has formed therein spaced, axially extending guide channels 1A and 1B, which extend parallel to the optical axis (See FIG. 4). The focusing lens system $L_1$ is threaded to the forward end portion of the tube 1 for advancement and retraction therewith, and the image forming lens system M is fixedly mounted within the tube 1 toward the rear thereof.

The first and second movable lens groups $L_2$ and $L_3$ constituting the magnification varying system have lens frames 2 and 3 respectively and are slidably mounted within the fixed tube 1 between the focusing lens system $L_1$ and the image forming lens system M.

Figure 4:
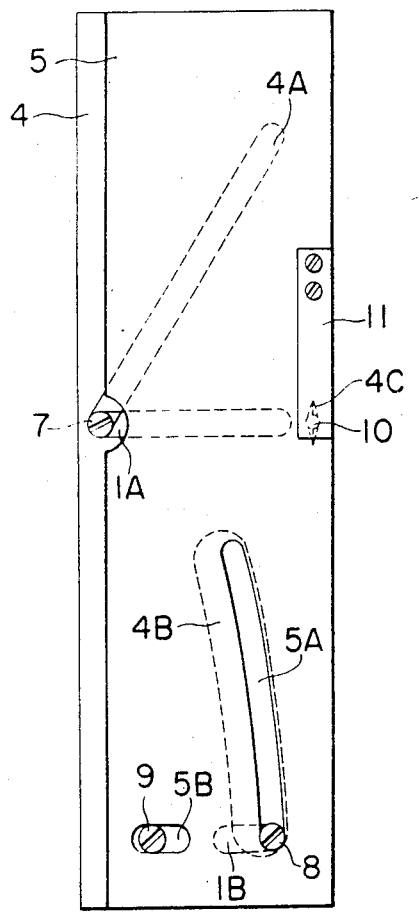
FIG. 4 is a view showing the circumferential surfaces of the first and second cam cylinders developed as flat surfaces arranged to overlap to show the relationship between the fixed lens tube, the first cam cylinder, and the second cam cylinder.

Around the fixed lens tube 1 there is rotatably fitted a first cam cylinder 4 formed with a first cam groove 4A and an escape groove 4B. A second cam cylinder 5 formed with a second cam groove 5A is rotatably fitted around the first cam cylinder 4. As shown in FIG. 4, the escape groove 4B is dimensioned so that its circumferential length is at least equal to the circumferential length of the second cam groove 5A and its axial width is equal to the axial distance over which the second cam groove 5A may be moved. An operating ring 6 is fitted around and fixed to the second cam cylinder 5. Cam pins 7 and 8 are fixed to the lens frames 2 and 3 respectively, the cam pin 7 extending through the straight guide channel 1A into the first cam groove 4A. The cam pin 8 extends through the straight guide channel 1B and the escape groove 4B into the second cam groove 5A.

Figure 3:
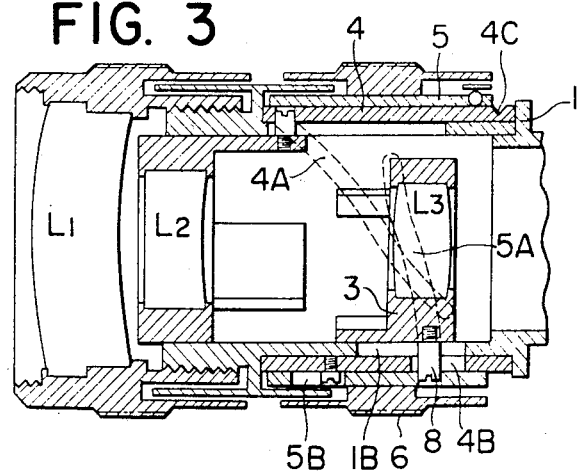
FIG. 3 is a view similar to FIG. 2 showing the second movable lens group moved from the position shown in FIG. 2 to a position for ultra-short distance focusing.

As shown in FIGS. 2–4, the first cam cylinder 4 is formed with a click groove $4c$, which coacts with a steel ball 10 positioned in a hole formed in the second cam cylinder 5, and a plate spring 11 is secured to the second cam cylinder 5. The click groove $4c$, steel ball 10 and plate spring 11 together constitute a releaseable holding means for maintaining the relative position between the first and second cam cylinders 4 and 5 and, therefore, the relative position between the first and second movable lens groups $L_2$ and $L_3$. The second cam cylinder 5 is formed with an elongated straight guide channel 5B extending along the optical axis. A pin 9 provided on the first cam cylinder 4 is cooperable with the straight guide channel 5B of the second cam cylinder to connect the cylinders to each other.

A normal zooming operation will now be described. In FIG. 2, the steel ball 10 forming the holding means is received into the click groove $4c$ to maintain the first and second movable lens groups $L_2$ and $L_3$ in their relative position for zooming. When the operating ring 6 is rotated, the second cam cylinder 5 is rotated with it and the first cam cylinder 4 is also rotated with the second cam cylinder 5 because the pin 9 fixed on the first cam cylinder 4 extends into the straight guide channel 5B in the second cam cylinder 5, and acts to connect the cam cylinders 4 and 5 to each other. Such rotation causes the second and third lens frames 2 and 3 to be moved axially because the cam pins 7 and 8 which follow cam grooves 4A and 5A pass through the channels 1A and 1B of the fixed tube 1. Thus, the first and second movable lens groups $L_2$ and $L_3$ are moved according to a predetermined relationship, thereby continuously varying the combined focal length of the entire lens system while maintaining the image plane in a predetermined position.

To effect the focusing for an ultra-short distance the operating ring 6 is first moved forward along the optical axis from the position of FIG. 2 to that shown in FIG. 3, thereby releasing the holding means $4c$ and 10 to allow the second cam cylinder 5 to move along the optical axis. The straight guide channel 5B guides cylinder 5 to coaction of the pin 9 fixed to the first cam cylinder 4. The second movable lens group $L_3$ is moved axially with cam cylinder 5 due to the cooperation between the pin 8 in the second movable lens frame 3 and the cam groove 5A formed in the cam cylinder 5. Thus, the intended focusing can be achieved.

When the operating ring 6 is rotated from the position of FIG. 3, the first and second cam cylinders 4 and 5 are rotated together due to the cooperation between the pin 9 of the first cam cylinder 4 and the straight guide channel 5B in the second cam cylinder 5. Accordingly, the first movable lens group $L_2$ is moved forward due to the cooperation between the cam pin 7 and the first cam groove 4A, and the second movable lens group $L_3$ also is moved forward due to the cooperation between the cam pin 8 and the second cam groove 5A. This accomplishes focusing for an ultra-short distance.

In the above-described embodiment, rotation of the operating ring 6 moves both the first and second movable lens groups $L_2$ and $L_3$, while axial movement of the operating ring 6 moves only the second movable lens group $L_3$. In an alternative arrangement, axial movement of the operating ring 6 moves both the movable lens groups $L_2$ and $L_3$ and rotation of the ring 6 moves only the second movable lens group $L_3$. In this arrangements the guide channel 5B takes the form of an elongated channel extending circumferentially of the second cam cylinder 5.

Also, instead of the second movable lens group $L_3$, the first movable lens group $L_2$ may be made to move individually.

It is believed that the advantages and improved results of the invention will be apparent from the foregoing description of a preferred embodiment of the invention. It will be apparent that various changes and modifications may be made without departing from the spirit and scope of the invention as sought to be defined in the following claims.

We claim:

1. A zoom lens assembly comprising a fixed tube having therein a focusing lens system, an image forming lens system to the rear of the focusing lens system and a magnification varying lens system including first and second movable lens groups interposed between the focusing and the image forming lens systems, the fixed tube having axially extending first and second guide channels, a first cam cylinder having a first cam groove rotatably fitted on the fixed tube, a second cam cylinder having a second cam groove rotatably fitted on the first cam cylinder, the first cam cylinder being formed with an escape groove where the second cam groove is situated, the axial width of the escape groove being at least equal to the axial distance over which the second cam groove may be moved and the circumferential length of the escape groove being at least equal to the circumferential length of the second cam groove, a first connecting member connecting one of the first and second movable lens groups to one of the first and second guide channels and one of the cam grooves, a second connecting member connecting the other movable lens group to the other guide channel, the escape groove and the other cam groove, means for connecting the first and second cam cylinders so that both cam cylinders may move circumferentially upon movement of one of the cylinders axially, and holding means provided between the first and second cam cylinders for maintaining the first and second movable lens groups in their relative position for zooming.

2. A zoom lens assembly according to claim 1, wherein the holding means comprises a click groove in one of the cam cylinders, a steel ball positioned to extend through the other cam cylinder, and a plate spring in engagement with the steel ball to resiliently urge the ball into the click groove.

3. A zoom lens assembly according to claim 1, wherein the first connecting member is fixed to the first movable lens group and connects the same to the first guide channel and the first cam groove; the second connecting member is fixed to the second movable lens group and connects the same to the second guide channel, the escape groove and the second cam groove; and the connecting means connects the first and second cam cylinders so that the second cam cylinder is movable axially, whereby when the second cam cylinder is shifted in the axial direction, only the second movable lens group is moved.

4. A zoom lens assembly according to claim 3, wherein the connecting means further includes a third axially extending guide channel formed on one of the first and second cam cylinders, and a pin fixed to the other of the cam cylinder positioned in the third guide channel.

5. A zoom lens assembly according to claim 4, wherein the third guide channel is formed on the second cam cylinder and the pin is fixed to the first cam cylinder.

6. A zoom lens assembly according to claim 3, wherein each of the first and second connecting members is a pin.

* * * * *